(12) United States Patent  (10) Patent No.: US 8,742,733 B2
Kiani et al.  (45) Date of Patent: Jun. 3, 2014

(54) METHODS AND APPARATUSES FOR ELIMINATION OF TORQUE PULSATION IN DOUBLY FED INDUCTION GENERATORS USING THE FIELD RECONSTRUCTION METHOD

(75) Inventors: Morgan M. Kiani, Arlington, TX (US); Wei Wang, Dallas, TX (US); Babak Fahimi, Arlington, TX (US); Wei-Jen Lee, Colleyville, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 609 days.

(21) Appl. No.: 13/098,273

(22) Filed: Apr. 29, 2011

(65) Prior Publication Data

US 2011/0267012 A1  Nov. 3, 2011

Related U.S. Application Data

(60) Provisional application No. 61/329,653, filed on Apr. 30, 2010.

(51) Int. Cl.
*H02P 9/00* (2006.01)
*H02P 9/04* (2006.01)

(52) U.S. Cl.
USPC ............................................. 322/44; 290/44

(58) Field of Classification Search
CPC ........................................................ H02P 9/42
USPC .......... 322/24, 28, 20, 44; 700/286, 287, 290; 290/44, 55; 307/68; 318/568.2, 568.24, 318/156
See application file for complete search history.

(56) References Cited

U.S. PATENT DOCUMENTS

| 6,326,750 | B1 * | 12/2001 | Marcinkiewicz | ............. | 318/432 |
| 8,314,576 | B2 * | 11/2012 | Fahimi et al. | ............. | 318/400.21 |
| 8,415,818 | B2 * | 4/2013 | Engelhardt et al. | ............. | 290/44 |
| 2011/0298310 | A1 * | 12/2011 | Ross et al. | ...................... | 310/20 |

\* cited by examiner

*Primary Examiner* — Julio Gonzalez
(74) *Attorney, Agent, or Firm* — Chowdhury & Georgakis, P.C.

(57) ABSTRACT

Methods and apparatuses for substantially eliminating torque pulsation in a doubly fed induction machine are disclosed. An example method comprises: measuring a stator current of the doubly fed induction machine, measuring a rotor current of the doubly fed induction machine, calculating a total magnetic flux density in an airgap of the doubly fed induction machine, calculating a tangential force density, calculating an electromagnetic torque, repeating the calculation of the electromagnetic torque over one electrical cycle to estimate a torque pulsation, determining a new rotor current that substantially eliminates the torque pulsation by referencing a set of optimal rotor currents in a look-up table, and changing the rotor current in response to the determination. Other embodiments are described and claimed.

20 Claims, 15 Drawing Sheets

METHODS AND APPARATUSES FOR ELIMINATION OF TORQUE PULSATION IN DOUBLY FED INDUCTION GENERATORS USING THE FIELD RECONSTRUCTION METHOD

CROSS REFERENCE TO RELATED APPLICATIONS

This application claims the benefit of the filing date of U.S. provisional patent application No. 61/329,653, incorporated herein by reference, which was filed on Apr. 30, 2010, by the same inventors of this application.

STATEMENT REGARDING FEDERALLY SPONSORED RESEARCH

This invention was made with government support under Grant Number N00014-09-1-0572 awarded by the Office of Naval Research. The government has certain rights in the invention.

FIELD OF THE INVENTION

The present invention generally relates to the field of wind power generation and the field reconstruction method. More particularly, the invention relates to the design, modeling, and fault tolerant control of such systems using the field reconstruction method.

BACKGROUND OF THE INVENTION

Steady growth of the demand for fossil fuels has resulted in major economic and environmental challenges in the past few years. Energy, as a measure of wealth, has turned into an international commodity and as such, new technologies for optimal harvest, storage, transmission, and consumption of various energy forms have occupied the center stage of the research and academic communities. Wind energy as a sustainable resource (i.e. abundant, affordable, environmentally neutral, and sizable) has attracted considerable attention among the alternative sources of energy. Doubly Fed Induction Generators (DFIG) have demonstrated superior advantages in comparison to other forms of electric machinery in the optimal harvest of wind energy as an adjustable speed generator system. Although control of DFIG has been addressed in the literature in length, its interaction with the power grid still looks far from exhausted. In particular, the effects of system unbalance and system harmonics have been shown to be of great concern. This is primarily due to the fact that system unbalance and harmonics can generate unwanted torque undulations that can potentially undermine the mechanical integrity of the tower and reduce the lifetime of the moving components that are attached to the generator shaft.

The enabling technology for optimal calculation of the rotor currents is based on the field reconstruction method (FRM). FRM is an analytical tool for approximation of the magnetic field distribution within the airgap of an unsaturated electromechanical energy converter using a truncated generalized Fourier series. The basis function used in this Fourier expansion is computed using simple (one time) magnetostatic field solution of the stator/rotor excitation by a dc-current. Once the FRM formulation is set up, it is capable to predict the magnetic field distribution and hence, the tangential/normal components of the magnetic forces for any arbitrary distribution of the stator and rotor currents. This in turn paves the road for optimization of the field distribution by computing the desired excitation of the stator and rotor currents in a very short time (about two orders of magnitude faster than Finite Element Analysis).

The embodiment described herein solves these problems and others by proposing a new method of using the Field Reconstruction Method and numerical optimization method in judiciously selecting rotor currents to actively eliminate/mitigate torque pulsations. The method may be augmented to a tool for elimination of the vibrations caused from mechanical origins.

SUMMARY

In one respect, disclosed is an apparatus for substantially eliminating torque pulsation in a doubly fed induction machine, the apparatus comprising: one or more processors and one or more memory units coupled to the processors. The apparatus being configured to: measure a stator current of the doubly fed induction machine, measure a rotor current of the doubly fed induction machine, calculate a total magnetic flux density in an airgap of the doubly fed induction machine, calculate a tangential force density, calculate an electromagnetic torque, repeat the calculation of the electromagnetic torque over one electrical cycle to estimate a torque pulsation, determine a new rotor current that substantially eliminates the torque pulsation by referencing a set of optimal rotor currents in a look-up table, and change the rotor current in response to the determination.

In another respect, disclosed is a method for substantially eliminating torque pulsation in a doubly fed induction machine, the method comprising: measuring a stator current of the doubly fed induction machine, measuring a rotor current of the doubly fed induction machine, calculating a total magnetic flux density in an airgap of the doubly fed induction machine, calculating a tangential force density, calculating an electromagnetic torque, repeating the calculation of the electromagnetic torque over one electrical cycle to estimate a torque pulsation, determining a new rotor current that substantially eliminates the torque pulsation by referencing a set of optimal rotor currents in a look-up table, and changing the rotor current in response to the determination.

Numerous additional embodiments are also possible.

BRIEF DESCRIPTION OF THE DRAWINGS

Features and advantages of the present invention will become apparent from the appended claims, the following detailed description of one or more example embodiments, and the corresponding figures.

DETAILED DESCRIPTION OF ONE OR MORE EMBODIMENTS

Figure 1A:
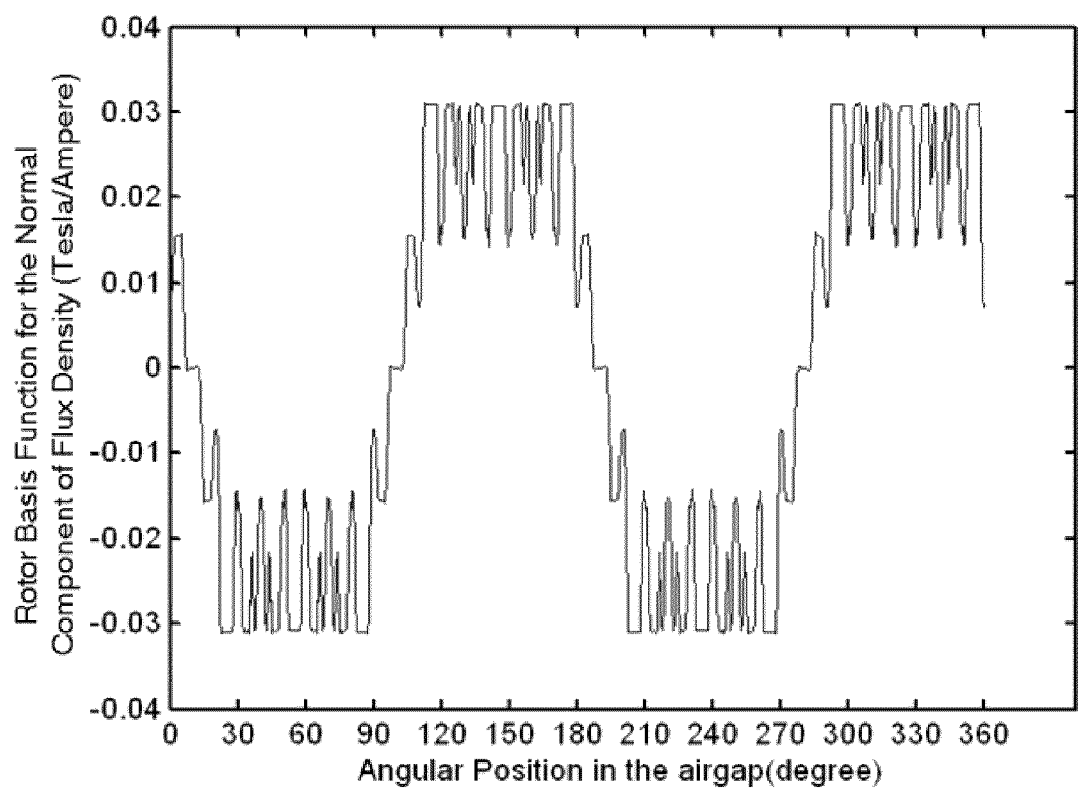
FIGS. 1A and 1B are graphs depicting the normal and tangential basis functions of rotor winding phase A, respectively, in accordance with some embodiments.

The drawing figures are not necessarily to scale and certain features may be shown exaggerated in scale or in somewhat generalized or schematic form in the interest of clarity and conciseness. In the description which follows like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

Wind energy as a sustainable resource has attracted considerable attention among the alternative sources of energy. Doubly Fed Induction Generators (DFIG) have demonstrated superior advantages in comparison to other forms of electric machinery in the optimal harvest of wind energy as an adjustable speed, grid connected generator system. The effects of grid unbalance and harmonics have been shown to be of great concern for the safe and economic operation of DFIG. This is primarily due to the fact that system unbalance and harmonics can generate unwanted torque undulations which can potentially undermine the mechanical integrity of the tower and reduce the lifetime of the moving components that are attached to the generator shaft. Usually, the wind generators have to be disconnected when the unbalance and harmonics exceed certain limits. Previous works on this problem are based on analysis methods which use the simplified circuit model of DFIG. The analysis methods are complicated and indirect. Furthermore, the inaccuracy in the DFIG model definitely leads to inaccurate solution of this problem. As DFIG are controlled through rotor current, the embodiments disclosed herein use the accurately reconstructed field model of DFIG and the numerical optimization method to identify the best rotor current to actively and substantially eliminate the torque ripple. The system and techniques described use the measured stator and rotor current to reconstruct the field in the airgap of the machine and then to calculate the torque on the rotor. Then, the numerical optimization method is used to find the optimal rotor current which can minimize the rotor torque ripple. Optimized current wave forms under different unbalance and harmonic stator voltages and their corresponding stator current currents are calculated and stored. Whenever the unbalance and harmonics are detected, the corresponding optimal rotor current waveforms are selected and injected into the rotor windings. This method may be applied to DFIG and Doubly Fed Induction Machine drive systems.

Effects of system unbalance and harmonics can result in undesired components of magneto-motive force in the airgap of DFIG (similar cases can happen in permanent magnet or singly fed induction generators). In particular, existence of system unbalance in the magnitude of the stator currents can originate a clockwise and a counter clockwise field components in the airgap of the DFIG. Assuming a sinusoidal distribution of the stator winding, the resulting magneto-motive force (MMF) in the presence of the unbalanced stator currents is given by:

$$MMF_s = \frac{N_S}{2}\sqrt{2}\left[\begin{array}{l}\left(\frac{I_A+I_B+I_C}{2}\right)\cos(\omega_e t - \phi_s) + \\ \left(\frac{2I_A-I_B-I_C}{4}\right)\cos(\omega_e t + \phi_s) + \\ \frac{\sqrt{3}}{4}(I_B-I_C)\sin(\omega_e t + \phi_s)\end{array}\right], \quad (1)$$

where $\omega_e$, $I_A$, $I_B$, $I_C$, $\phi_S$, $N_S$ represent stator electrical frequency, magnitudes of phases A, B, and C currents, displacements on the stator, and number of total conductors per phase respectively. Similarly, in the presence of a current harmonic, the magneto-motive force resulting from the stator winding will be in the following form:

$$MMF_s = \frac{3N_S}{4}\sqrt{2}\,I_A\cos(k\omega_e t - \phi_s), \quad (2)$$

where k represents the order of the harmonic. Existence of harmonics in the stator currents can create components of the magnetic fields that rotate at a speed other than the synchronous speed resulting in undesired torque harmonics. Therefore, by an intuitive approach and given a balanced magneto-motive force due to the rotor winding, one can expect that unbalance in the stator current magnitudes originates a dc torque component along with a component rotating at a speed of $2\omega_e$, that the system harmonics will result in a torque harmonic at a frequency of $(k-1)\omega_e$, and that the system harmonics along with the system harmonic will result in torque harmonics at the frequencies of 0, $2\omega_e$, $(k-1)\omega_e$, and $(k+1)\omega_e$. The low frequency nature of these vibrations can create significant damage (especially if a mechanical resonance takes place) to the mechanical integrity of the tower, turbine, and other moving components that are attached to the shaft of the generator. One may note that the existing trend in increasing the size of the wind turbines over the past few years will more likely reduce the natural frequencies of the mechanical installation, thereby making it more vulnerable to mechanical resonances that are caused by the above phenomenon. The embodiments in this invention are based on the development of a set of optimal rotor currents such that the undesirable effects of the unbalanced stator currents (undesirable stator field components) are actively compensated for.

In order to understand the computational structure of the proposed method, a short description of the FRM method is described. Field reconstruction method is a numerical approach that provides an accurate estimation of the tangential and normal components of the electromagnetic field within the airgap of an electromechanical energy conversion device. Unlike the Finite Element method, FRM takes advantage from the periodic structure and excitation of the electrical machines, thereby avoiding redundant numerical procedures which are the main contributor to the computational times of the FEA. The main underlying condition in applying FRM method is the linear magnetic behavior of the electromechanical converter. This condition is well accepted in generators as magnetic saturation will unleash unwanted system harmonics to the system that are to be avoided at any cost. In fact, except for switched reluctance machines, magnetic saturation is viewed as an undesirable phenomenon in most electric machinery, especially when high quality control is of prime interest. The basic formulation used in description of the FRM model of an AC winding is similar to that of a truncated Fourier series. For instance, the FRM formulation of a multiphase stator winding form by N conductors located at locations $\phi_{sk}$, k=1, ..., N carrying a current of $i_{sk}$, k=1, ..., N is given by:

$$B_{ts}(\phi_s) = \sum_{k=1}^{N} i_{sk} \cdot h_{ts}(\phi_s - \phi_{sk}) \quad (3)$$

$$B_{ns}(\phi_s) = \sum_{k=1}^{N} i_{sk} \cdot h_{ns}(\phi_s - \phi_{sk}),$$

where $h_{ts}(\phi_s)$, and $h_{ns}(\phi_s)$ represent the basis functions for tangential and normal components of the magnetic flux density on a contour that is located in the airgap. These basis functions are computed using a single magneto static field computation where a current of 1[A] is applied to a single conductor located at the reference axis of the $\phi_s$. The tangential and normal flux densities due to this excitation are captured on the contour of interest and are used as basis functions. The apparent use of superposition in equation (3) indicates that magnetic nonlinearities such as saturation are not included in the derivation. One may also note that:

$$\int_0^{2\pi} h_{ts}(\phi_s) h_{ns}(\phi_s) d\phi_s = 0. \quad (4)$$

The orthogonal set of basis function may also be computed for one phase of the machine to further simplify the computations. One may note that the finite number of terms in the truncated Fourier series of equation (3) stems from the finite number of stator slots and conductors. It is also important to note that the tangential and normal basis functions exhibit the properties of an even and odd analytical function respectively. These basis functions may be stored using their trigonometric Fourier expansion or simply as a look up table. Once this is done the contribution of the stator winding to any arbitrary selection of the phase currents may be computed as a Sum of Products (SOP).

Using a similar computation as in equation (3), one may obtain the contribution of the three phase rotor winding in a doubly fed induction machine, i.e.:

$$B_{tr}(\phi_r) = \sum_{j=1}^{M} i_{rj} \cdot h_{tr}(\phi_r - \phi_{rj}) \quad (5)$$

$$B_{nr}(\phi_r) = \sum_{j=1}^{M} i_{rj} \cdot h_{nr}(\phi_r - \phi_{rj}).$$

One may note that in the case of a doubly fed induction machine, the rotor and the stator currents are measurable. Therefore by real time monitoring of the stator and rotor current, one may combine the contributions of the stator and rotor to obtain the total magnetic flux densities in the airgap, i.e.:

$$B_t(\phi_g) = \sum_{j=1}^{M} i_{rj} \cdot h_{tr}(\phi_g - \phi_{rj}) + \sum_{k=1}^{N} i_{sk} \cdot h_{ts}(\phi_g - \phi_{sk}) \quad (6)$$

$$B_n(\phi_g) = \sum_{j=1}^{M} i_{rj} \cdot h_{nr}(\phi_g - \phi_{rj}) + \sum_{k=1}^{N} i_{sk} \cdot h_{ns}(\phi_g - \phi_{sk}).$$

Once the tangential and normal components of the flux density over a given contour in the airgap of the DFIG are computed, using the Maxwell stress method, one will be able to compute the tangential force density and consequently, the electromagnetic torque using the following expression:

$$f_t(\phi_g) = \frac{1}{\mu_0} B_n(\phi_g) B_t(\phi_g) \quad (7)$$

$$T = LR \int_0^{2\pi} f_t(\phi_g) d\phi_g.$$

where $\mu_0$, N, M, $\phi_g$, $\phi_s$, $\phi_r$, $\phi_{sk}$, $\phi_{rj}$, $h_{ts}$, $h_{tr}$, $h_{ns}$, $h_{nr}$, $i_{sk}$, $i_{rj}$, L, and R denote permeability of the air, number of stator conductors, number of rotor conductors, displacement in the airgap, displacement in the stator, displacement in the rotor, location of the k-th conductor in stator, location of the j-th conductor in rotor, tangential basis function for the stator, tangential basis function of the rotor, normal basis function of the stator, normal basis functional of the rotor, magnitude of the current in the k-th stator conductor, magnitude of the current in the j-th conductor of the rotor, stack length of the stator, and rotor radius respectively. By dividing the contour into n equal segments, one can approximate the total torque for the given instant of time (and hence the respective rotor position) as follows:

$$T(\theta_r) \approx \frac{2\pi LR^2}{\mu_0 n} \sum_{m=1}^{n} B_n(\phi_{m,g}) B_t(\phi_{m,g}), \quad (8)$$

where $\theta_r$ represents the rotor position and is related to the stator and rotor displacements via:

$$\theta_r = \phi_s - \phi_r. \quad (9)$$

By consecutive computation of the electromagnetic torque over one electrical cycle, it is possible to estimate the average torque and torque pulsation. These quantities are computed at a much faster pace (two orders of magnitude faster) compared to FEA method thanks to the analytical formulation used in the field reconstruction method. The impressive speed of computation allows for integration of the FRM model in an optimization algorithm where numerous iterative steps are required. A three phase, 5 Hp, 208V doubly fed induction machine is used for demonstrating an embodiment of the invention. Details of the DFIG are shown in Table I.

TABLE I

DFIG Specifications

| Parameter | Value |
| --- | --- |
| Rated power | 5 Hp |
| Rated voltage | 208 V |
| Synchronous speed | 1800 RPM |
| Number of stator slots | 36 |
| Number of rotor slots | 48 |
| Stator/rotor coil material | Copper |
| Stator/rotor core material | M-19 |
| Core length | 3.5 inches |
| Stack length | 0.05 inches |
| Stator outer diameter | 9 inches |

Figure 1B:
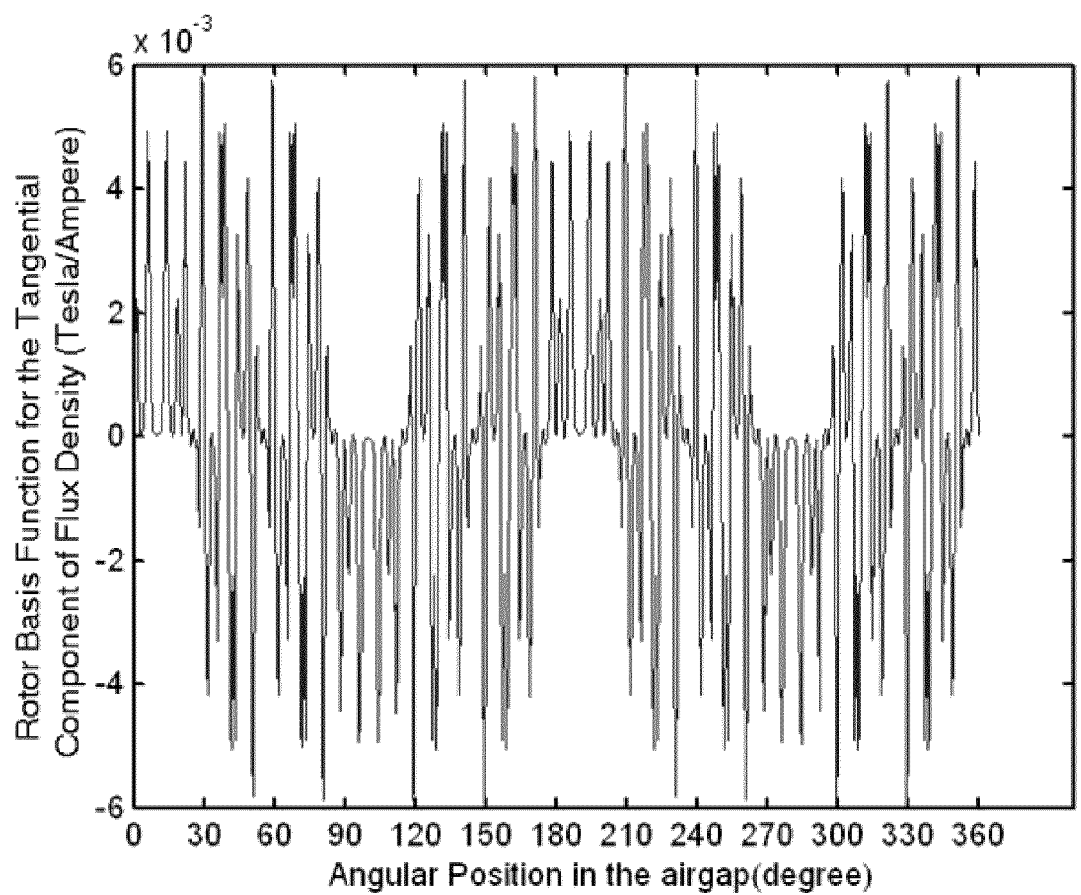
Figure 2A:
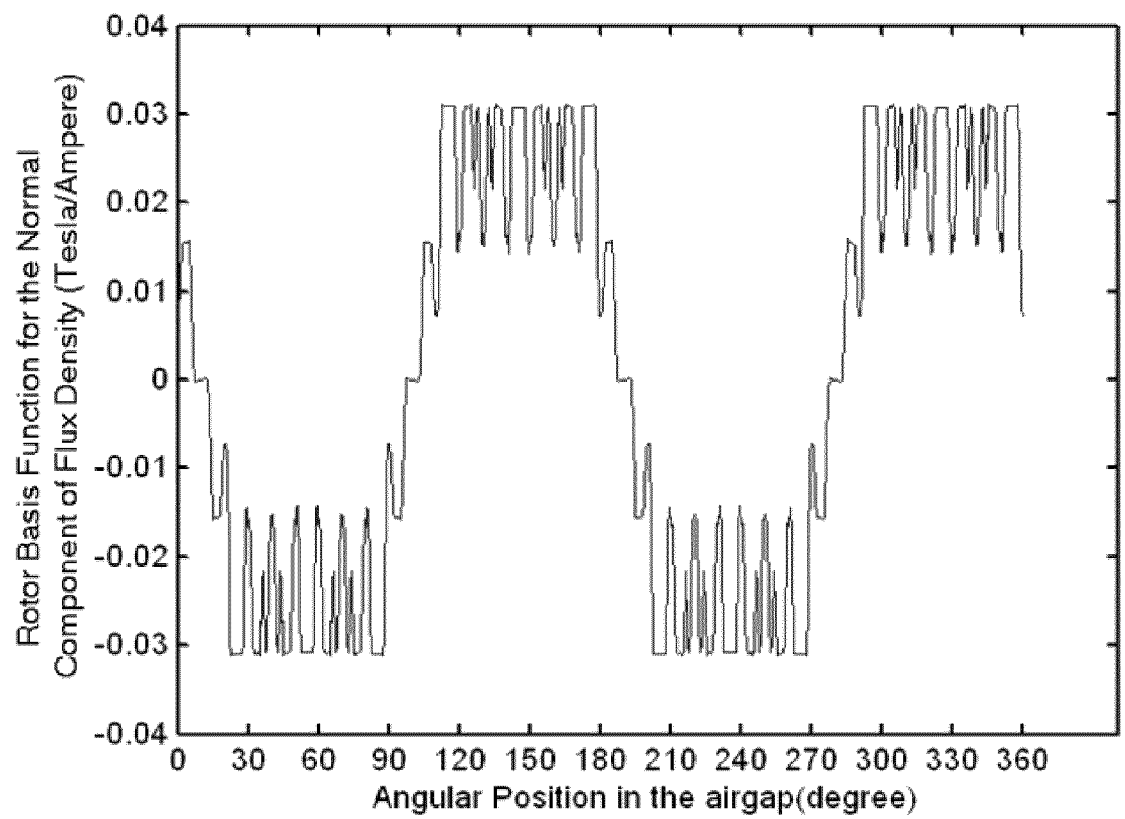
FIGS. 2A and 2B are graphs depicting the normal and tangential basis functions of stator winding phase A, respectively, in accordance with some embodiments.
Figure 2B:
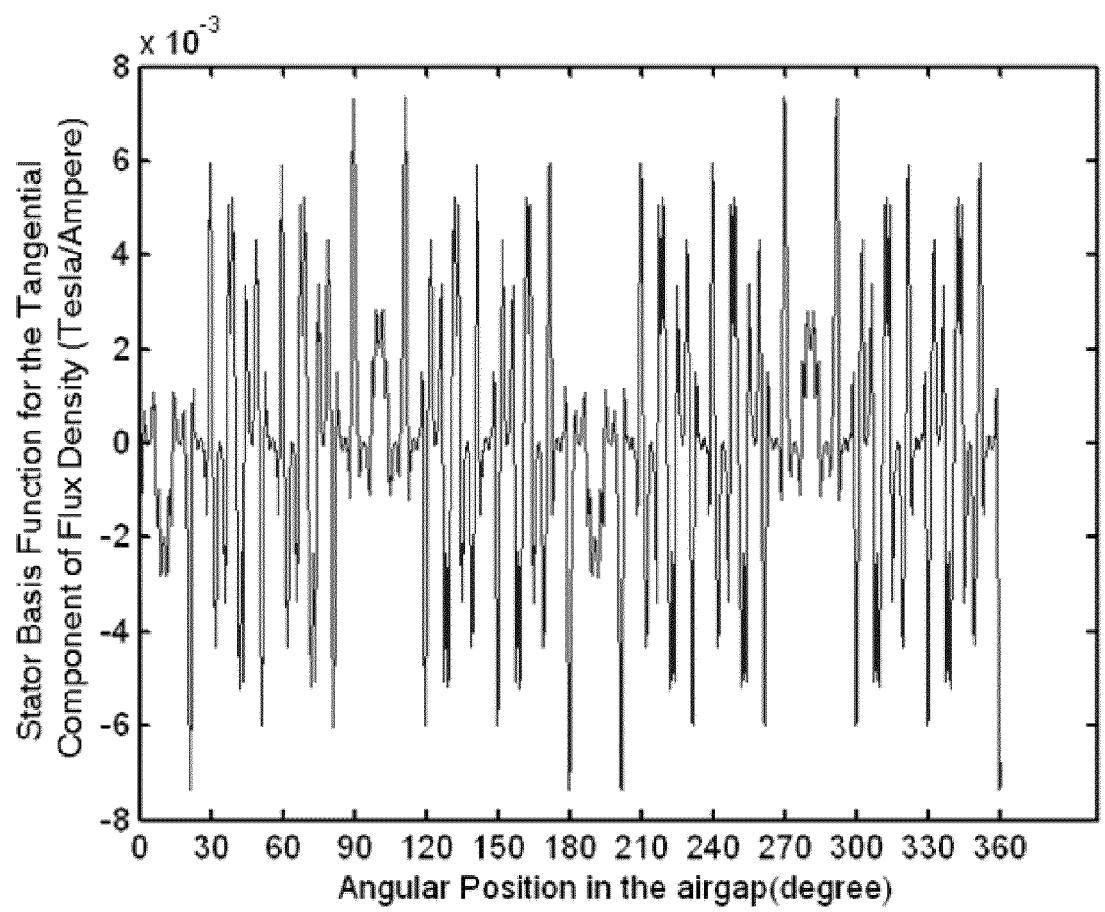
Figure 3A:
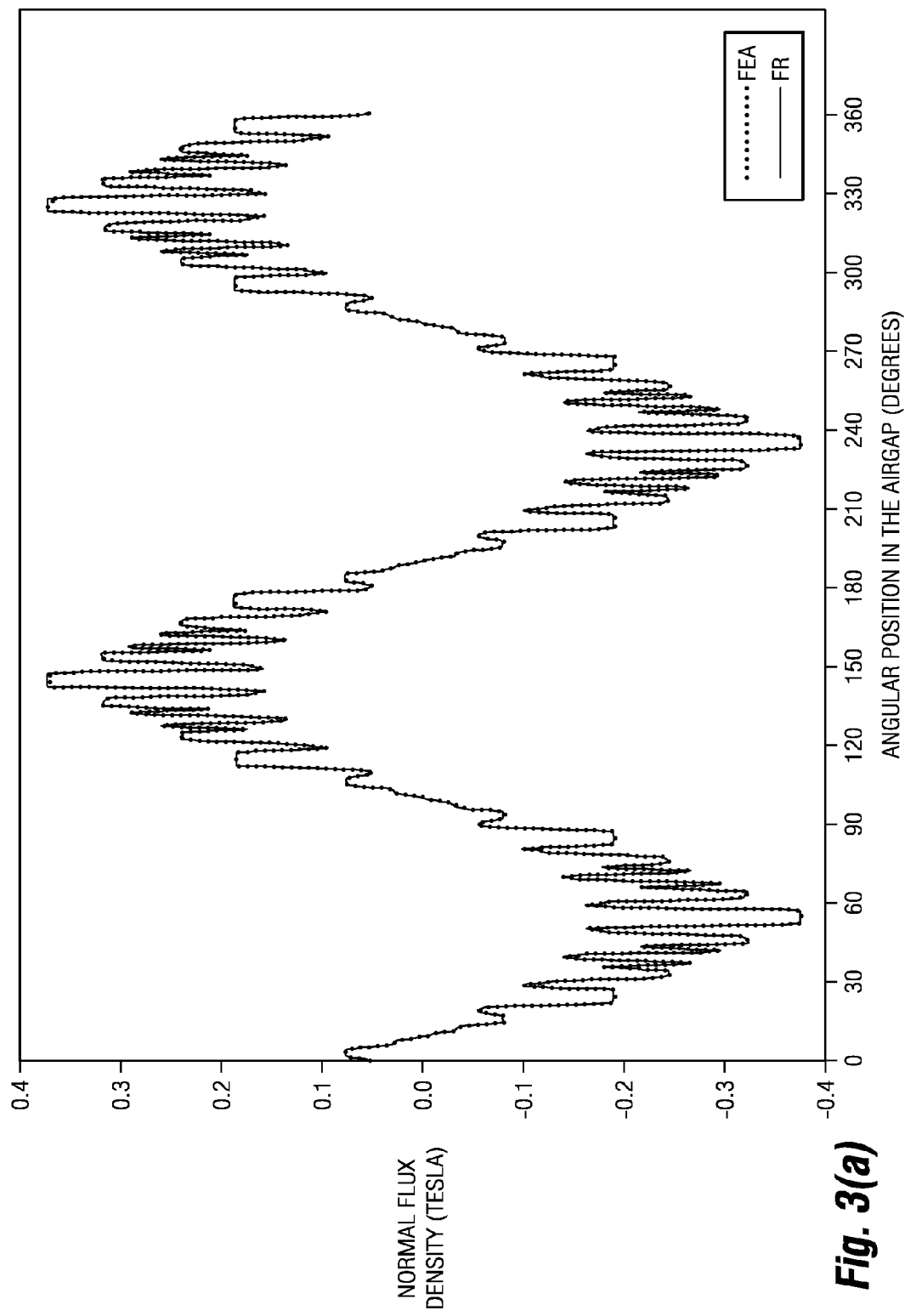
FIGS. 3A and 3B are graphs depicting the normal and tangential flux density, respectively, calculated by the Finite Element Analysis and Field Reconstruction Method, in accordance with some embodiments.
Figure 3B:
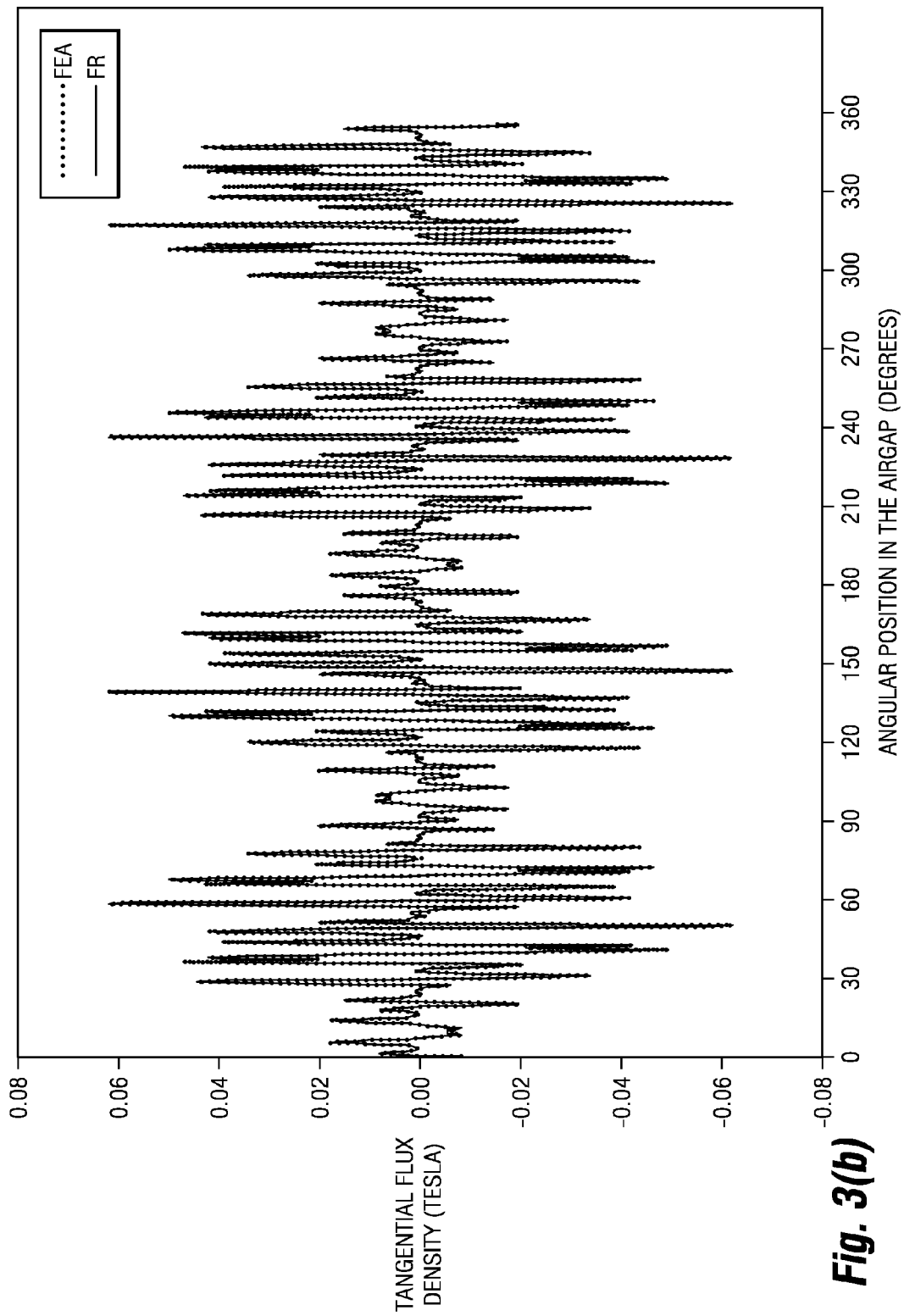

FIGS. 1A and 1B illustrate the normal and tangential basis function for the phase A of the stator winding, respectively. FIGS. 2A and 2B illustrate the normal and tangential basis function for the phase A of the rotor winding, respectively. The basis functions are computed for each phase as the connection, number of turns, and location of the stator windings are set and are not changing throughout the process. In the next step, at a standstill condition, distribution of the tangential and normal flux densities in the middle of the airgap subject to a balanced and sinusoidal excitation for the rotor and the stator are computed. FIGS. 3A and 3B illustrate a comparison of the normal and tangential flux densities, respectively, between the FRM and the FEA results for the DFIG of Table I. As can be seen, the results are in very good agreement with no appreciable difference between the FRM and the FEA results.

Figure 4:
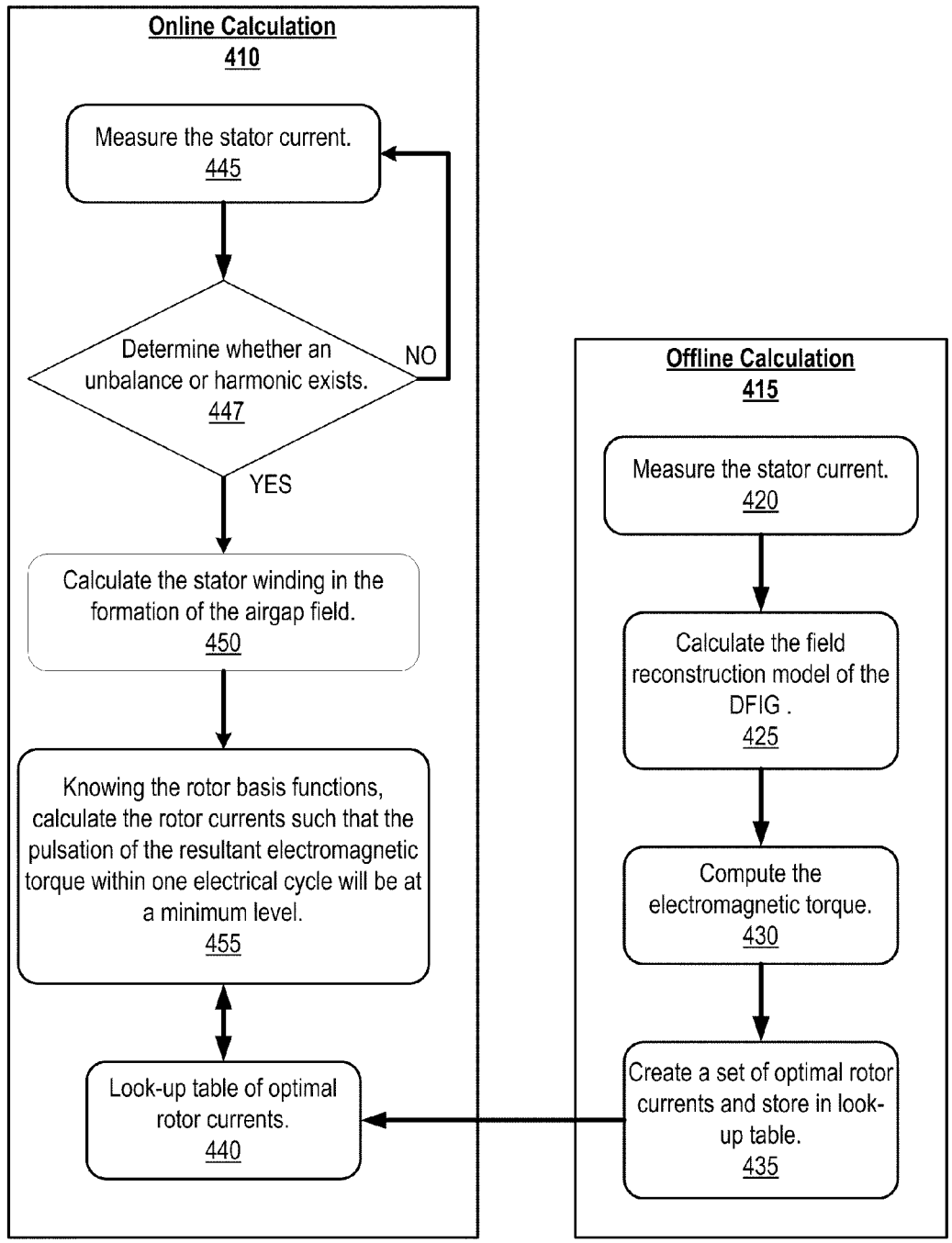
FIG. 4 is a block diagram illustrating a method for substantially eliminating a torque pulsation in doubly fed induction generators, in accordance with some embodiments.

FIG. 4 illustrates one embodiment of the method of the optimization. Two sets of calculations are processed, one online calculation 410 and the other offline calculation 415. In the offline calculation 415, which is described above in detail, the stator current is first measured 420. Next, the field reconstruction model of the DFIG is calculated 425 and used in computing the electromagnetic torque 430. From the set of electromagnetic torque calculations 430, a set of optimal rotor currents are computed 435 and stored in a look-up table 440. For the online calculation 410, the real time values of the stator currents are assumed to be measured and available. Once the stator currents are measured 445, a determination is made as to whether an unbalance or harmonic exists 447. If an unbalance or harmonic exists, the contributions of the stator winding in the formation of the airgap field are calculated 450. If an unbalance or harmonic does not exist, the process repeats back to measuring the stator currents 445. Knowledge of the rotor basis functions, will allow the calculation of the rotor currents, by referencing the look-up table 440, such that the pulsation of the resultant electromagnetic torque within one electrical cycle will be at a minimum level 455. It must be noted that it is desired to mitigate the torque pulsation under generating mode of operation subject to a satisfactory average torque. As a result, the desired value of the average tangential force is entered as a boundary condition. In addition, the thermal limitation of the rotor currents may be used as another boundary condition within the optimization routine. The optimization toolbox of Mathlab may be used for the optimization. The entire FRM model of the DFIG may be coded in a single m-file. A gradient optimization routine is selected for this embodiment. Calculations indicate that the calculation of the optimal currents may be completed within two electrical cycles, or 33 msec. What follows are the results of two case studies regarding the effects of system unbalance and system harmonics. Results indicate that FRM can be effectively used to mitigate the system induced vibrations.

Effects of System Unbalance:

The effects of the system harmonics are presented by a 10% drop in the magnitude of the phase-B current as shown in equation (10):

$$i_{as}[p.u.] = \cos(120\pi t)$$
$$i_{bs}[p.u.] = 0.9\cos\left(120\pi t - \frac{2\pi}{3}\right)$$
$$i_{cs}[p.u.] = \cos\left(120\pi t + \frac{2\pi}{3}\right).$$
(10)

Figure 5:
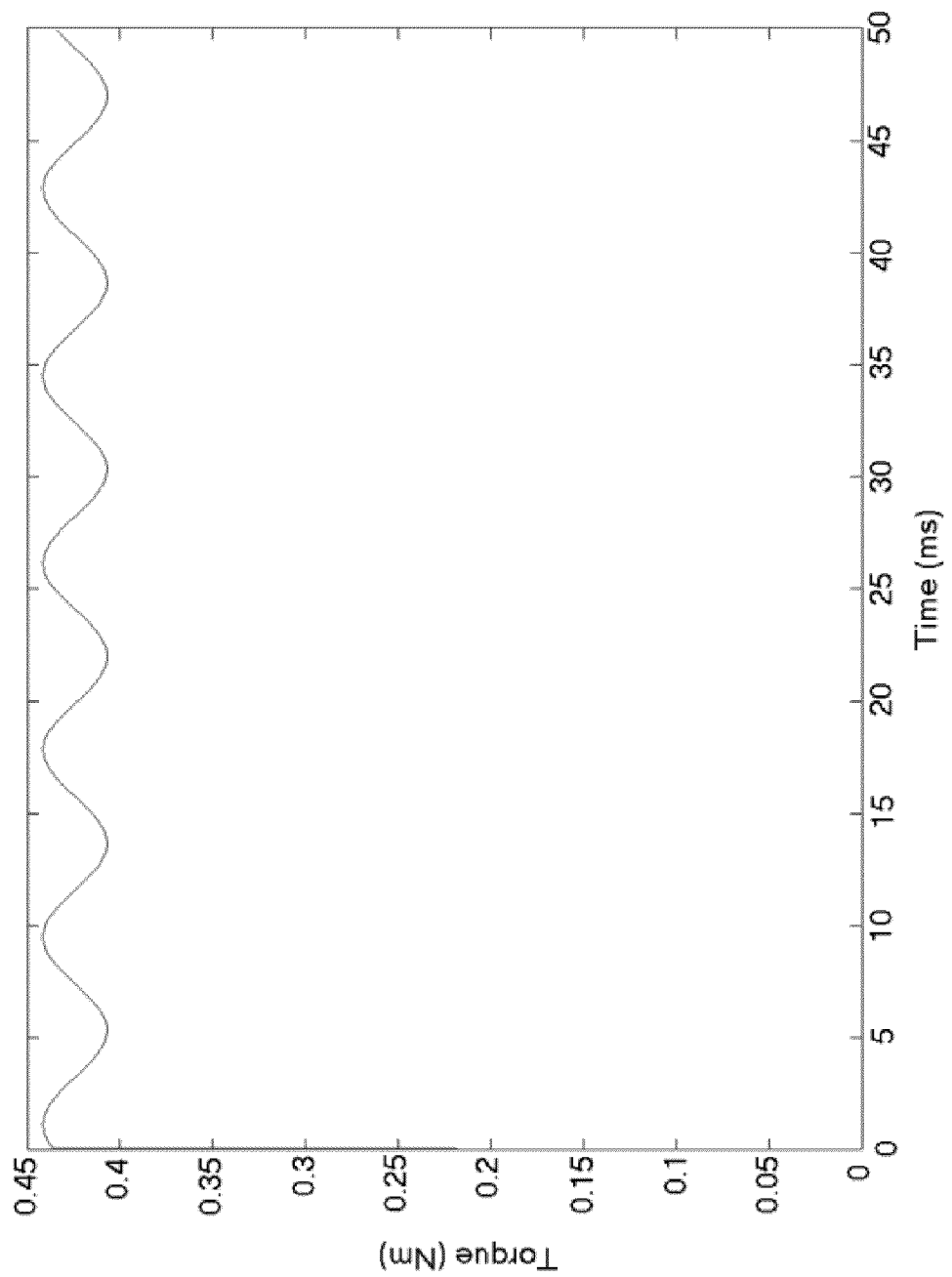
FIG. 5 is a graph depicting the torque pulsation at a frequency of 120 HZ due to 10% system unbalance condition, in accordance with some embodiments.
Figure 6:
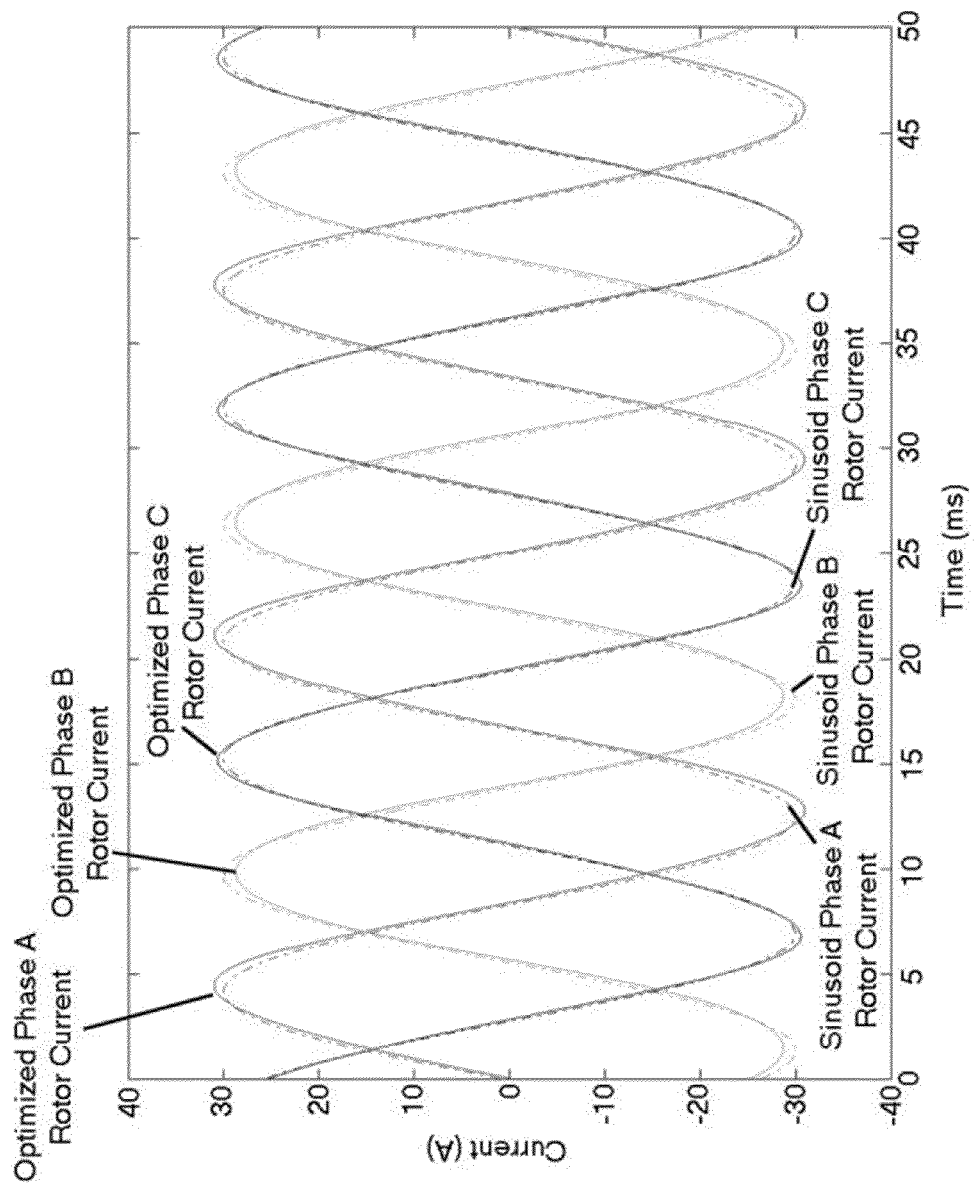
FIG. 6 is a graph depicting the optimal rotor currents for torque ripple cancellation, in accordance with some embodiments.
Figure 7:
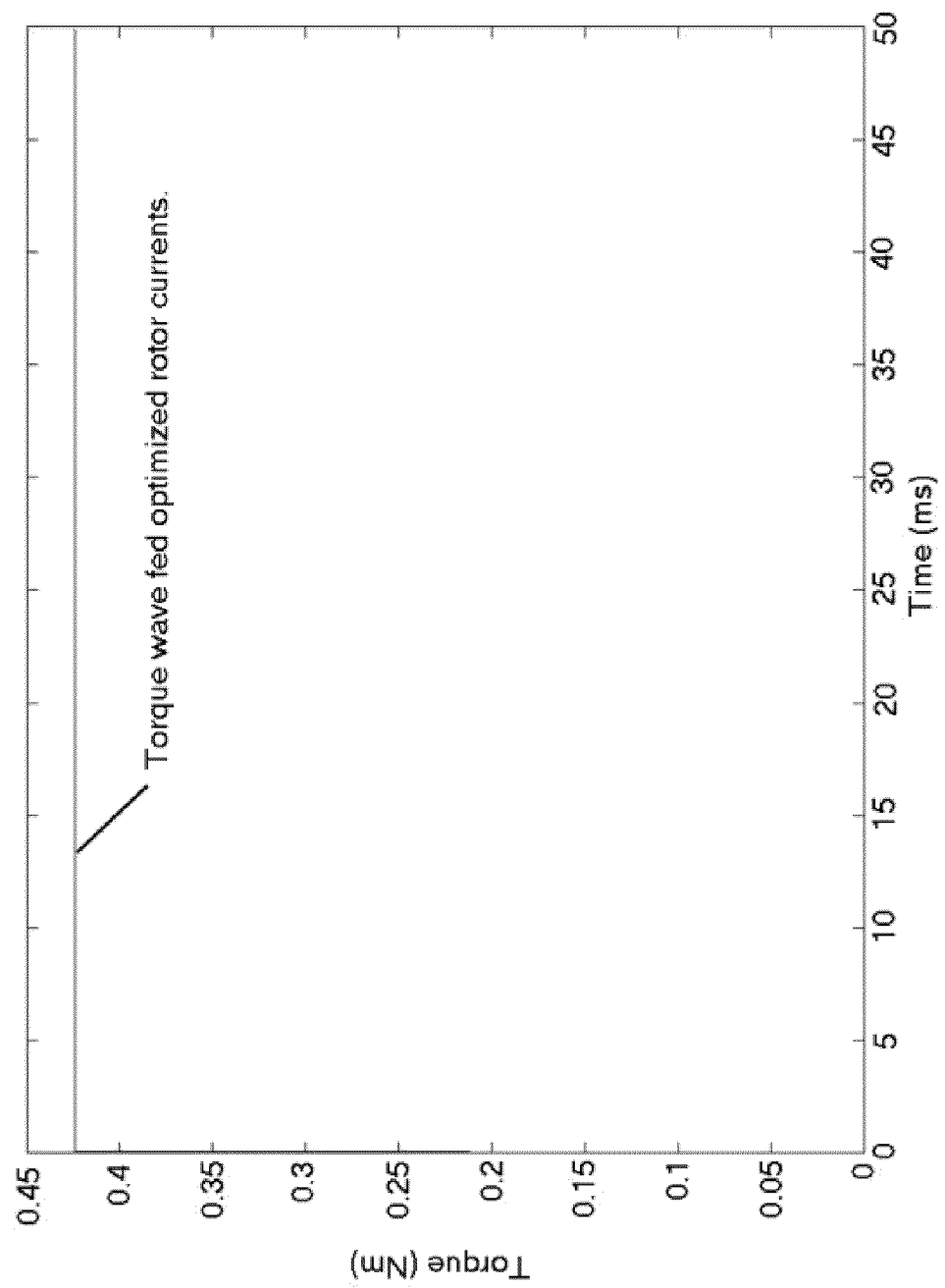
FIG. 7 is a graph depicting the optimized torque profile, in accordance with some embodiments.

As is shown in FIG. 5, given a set of balanced rotor currents, the electromagnetic torque at standstill exhibits an oscillation with a frequency of 120 HZ. This is twice as high as the system frequency, 60 HZ. The source of this undulation is the clockwise component of the stator field. By applying the disclosed optimization procedure, the optimal set of rotor currents may be computed. The objective of the optimization is to mitigate the torque pulsation without exceeding the thermal limitation on the rotor currents. For comparison of the deviation, the balanced sinusoidal currents are plotted in FIG. 6 along with the conventional excitation. FIG. 7 illustrates the optimized torque profile. As can be observed between FIG. 5 and FIG. 7, the torque pulsation has been significantly mitigated while the average torque has been maintained.

Figure 8:
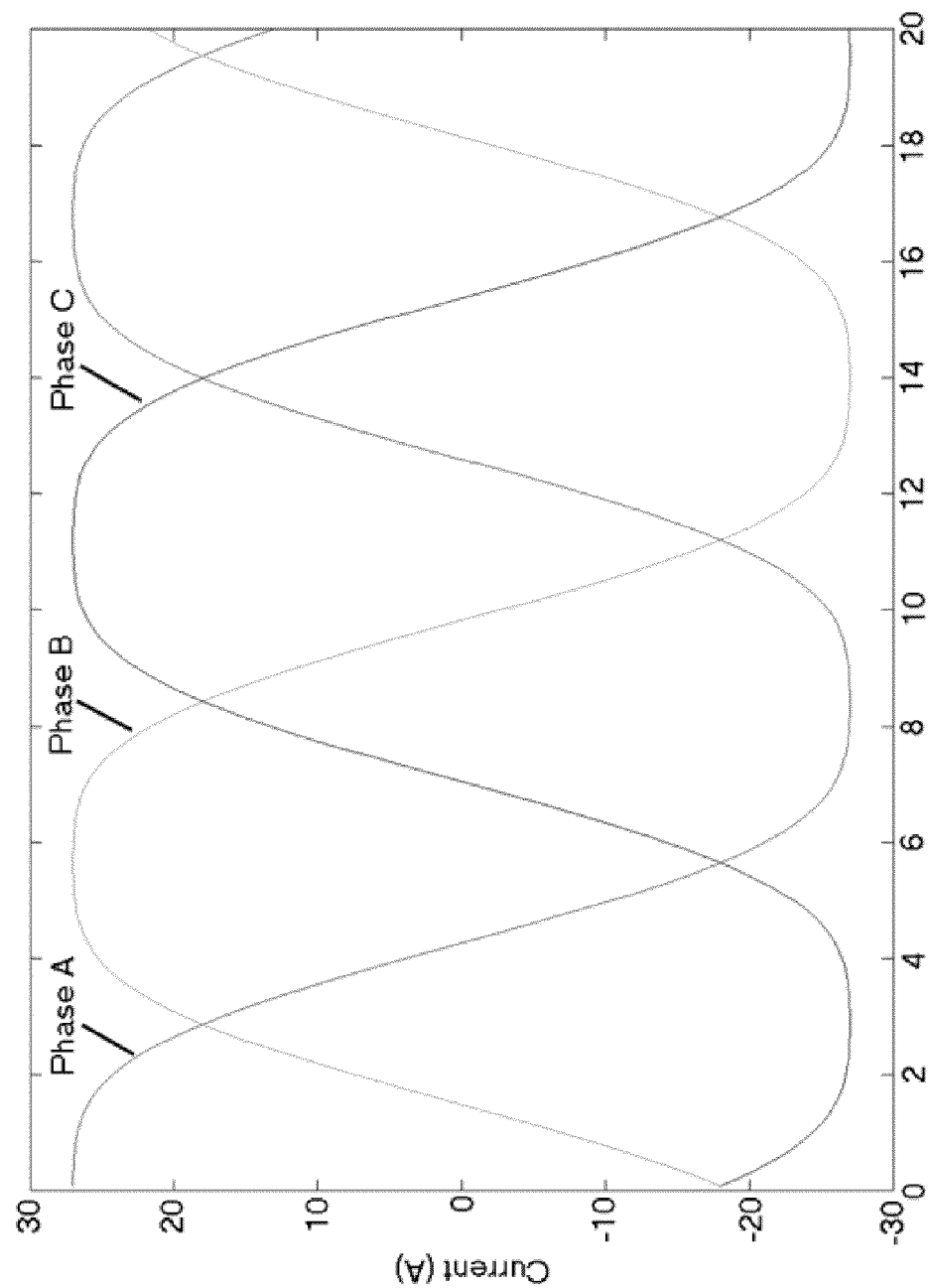
FIG. 8 is a graph depicting the stator current in the presence of the third harmonic, in accordance with some embodiments.
Figure 9:
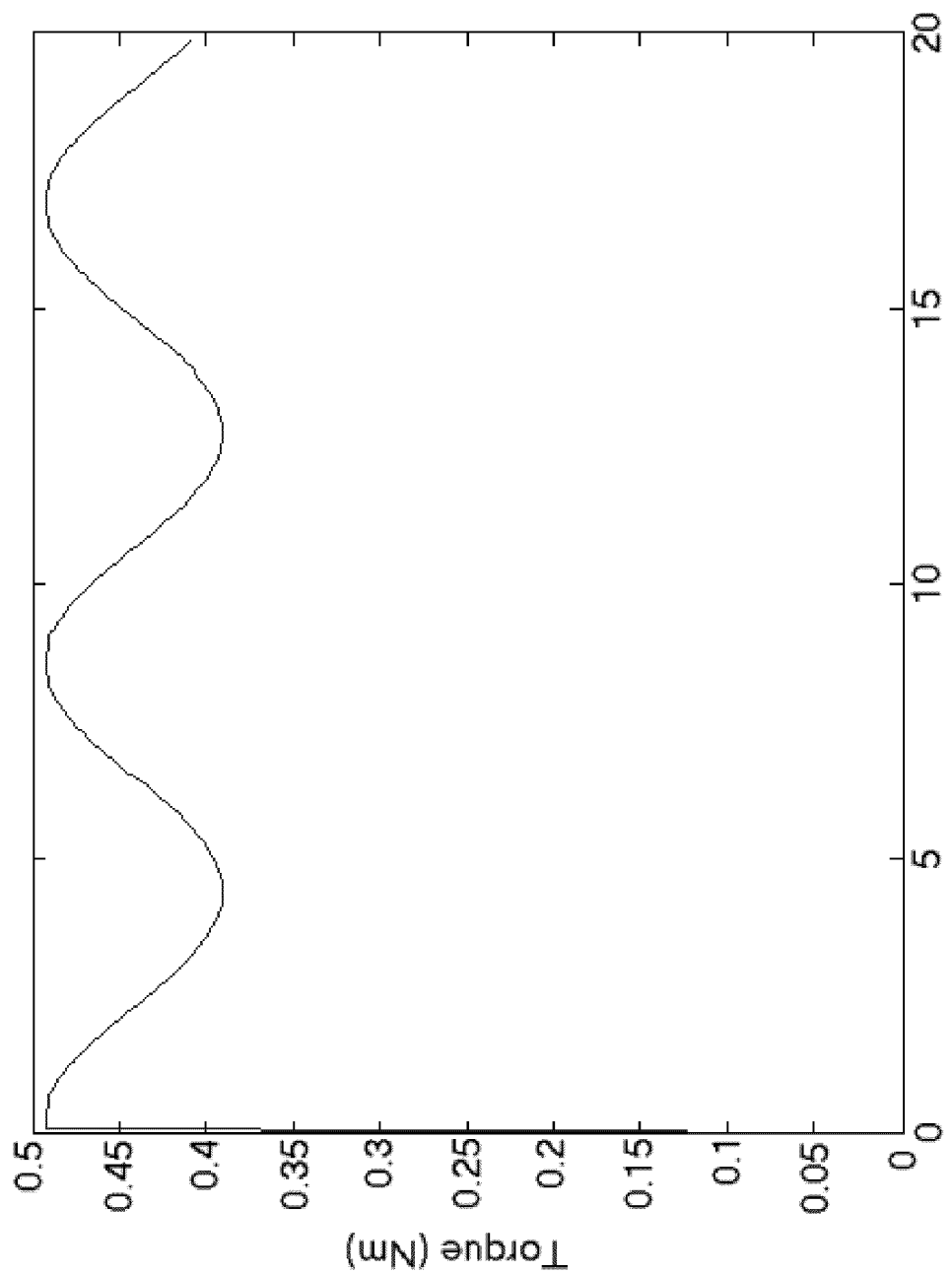
FIG. 9 is a graph depicting the torque pulsation due to system harmonics, in accordance with some embodiments.
Figure 10:
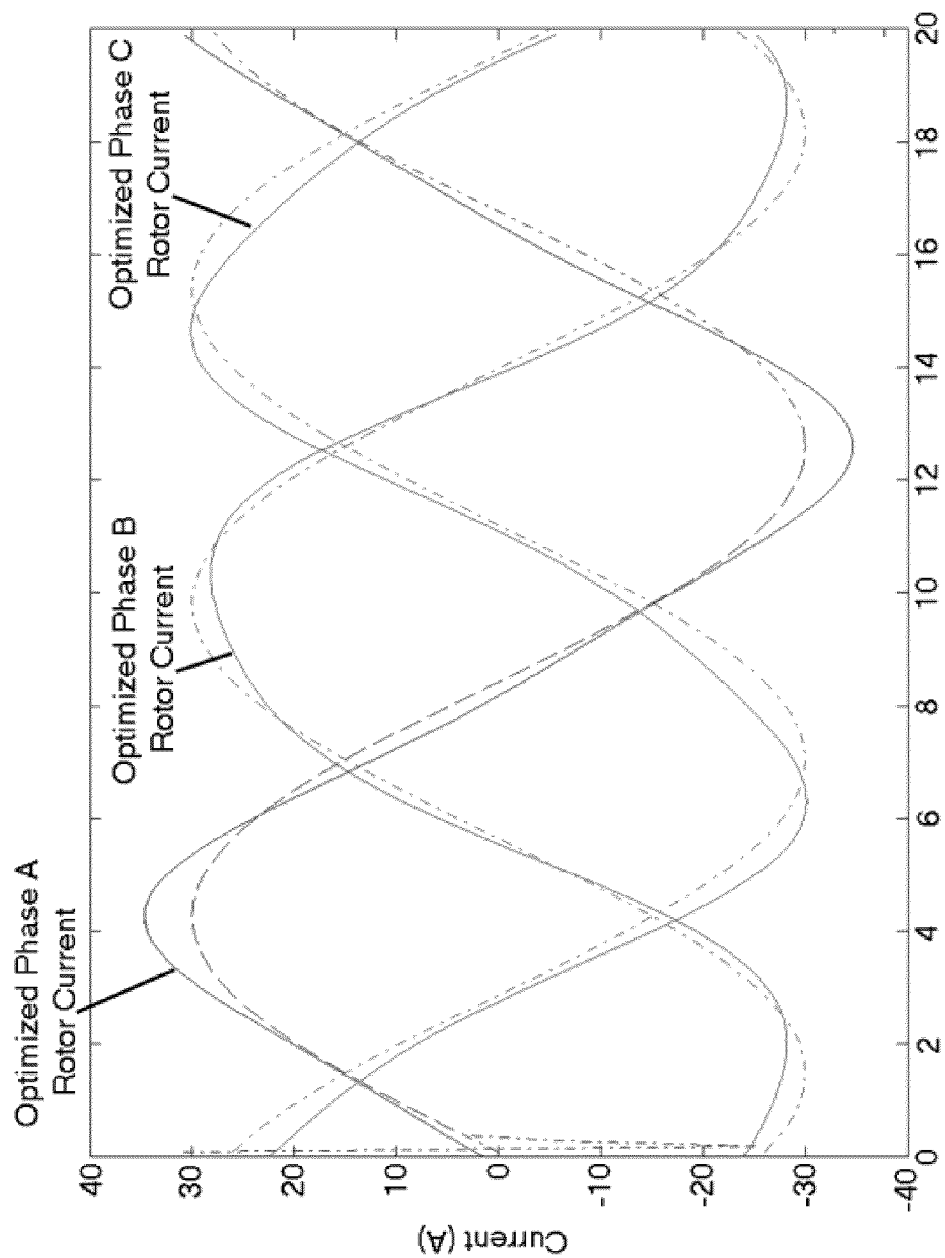
FIG. 10 is a graph depicting the optimized rotor currents to cancel system induced torque pulsation, in accordance with some embodiments.
Figure 11:
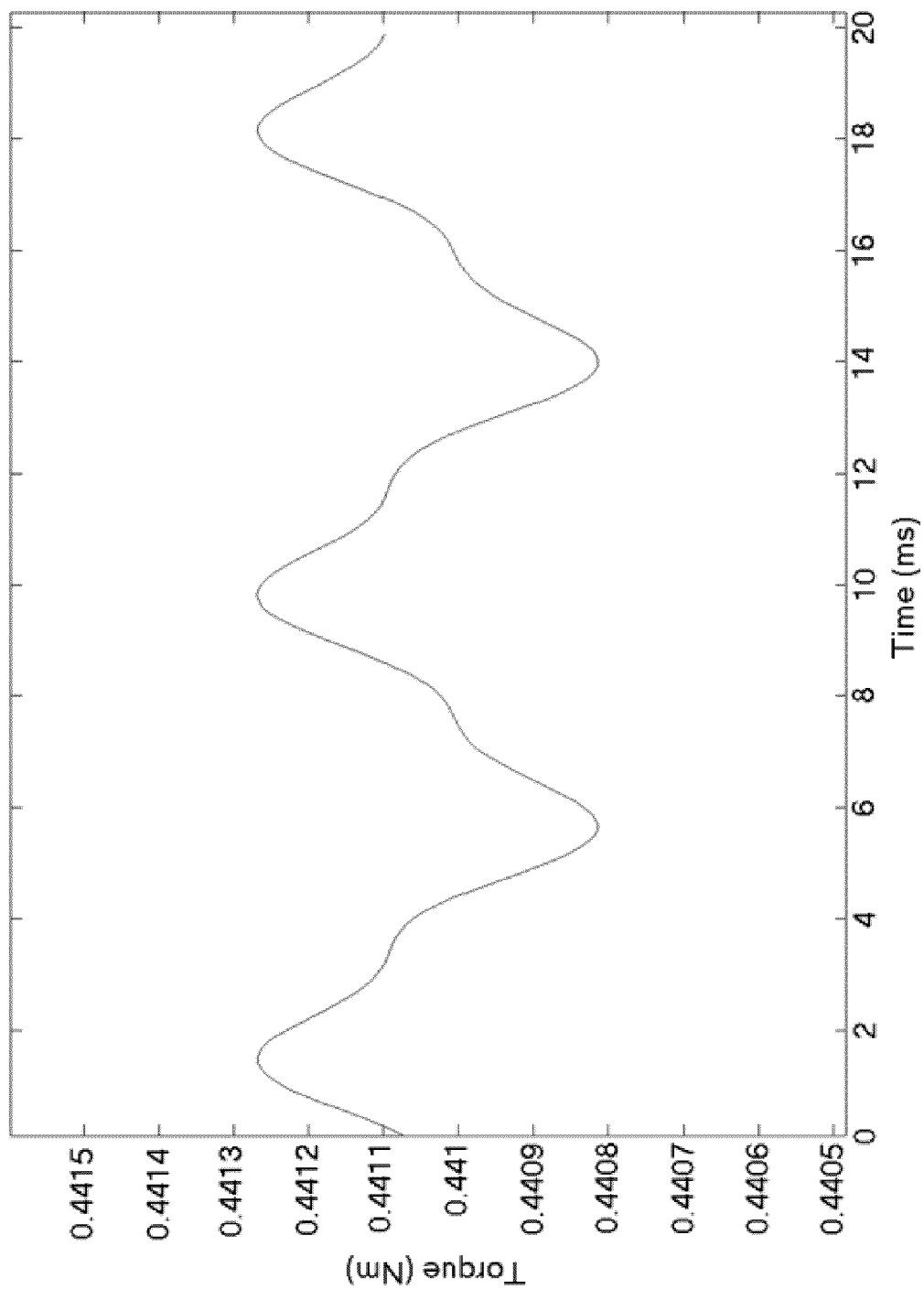
FIG. 11 is a graph depicting the optimized torque profile, in accordance with some embodiments.

Effects of System Harmonics:

The effects of the system harmonics are examined below FIG. 8 depicts the stator currents for the three phases, A, B, and C, containing a 10% $3^{rd}$ harmonic. Stator connections have been modified to allow the flow of the harmonics. As can be noted from FIG. 9, the third harmonics will induce a 120 HZ component of the torque. This torque pulsation is targeted in the disclosed optimization method and accordingly a set of optimized rotor currents are found and illustrated in FIG. 10. For comparison, the dashed lines in FIG. 10 show the sinusoid rotor currents for phases A, B, and C for a balanced system without harmonics. The new set of rotor currents will effectively cancel the system induced torque pulsation as shown in FIG. 11.

Figure 12:
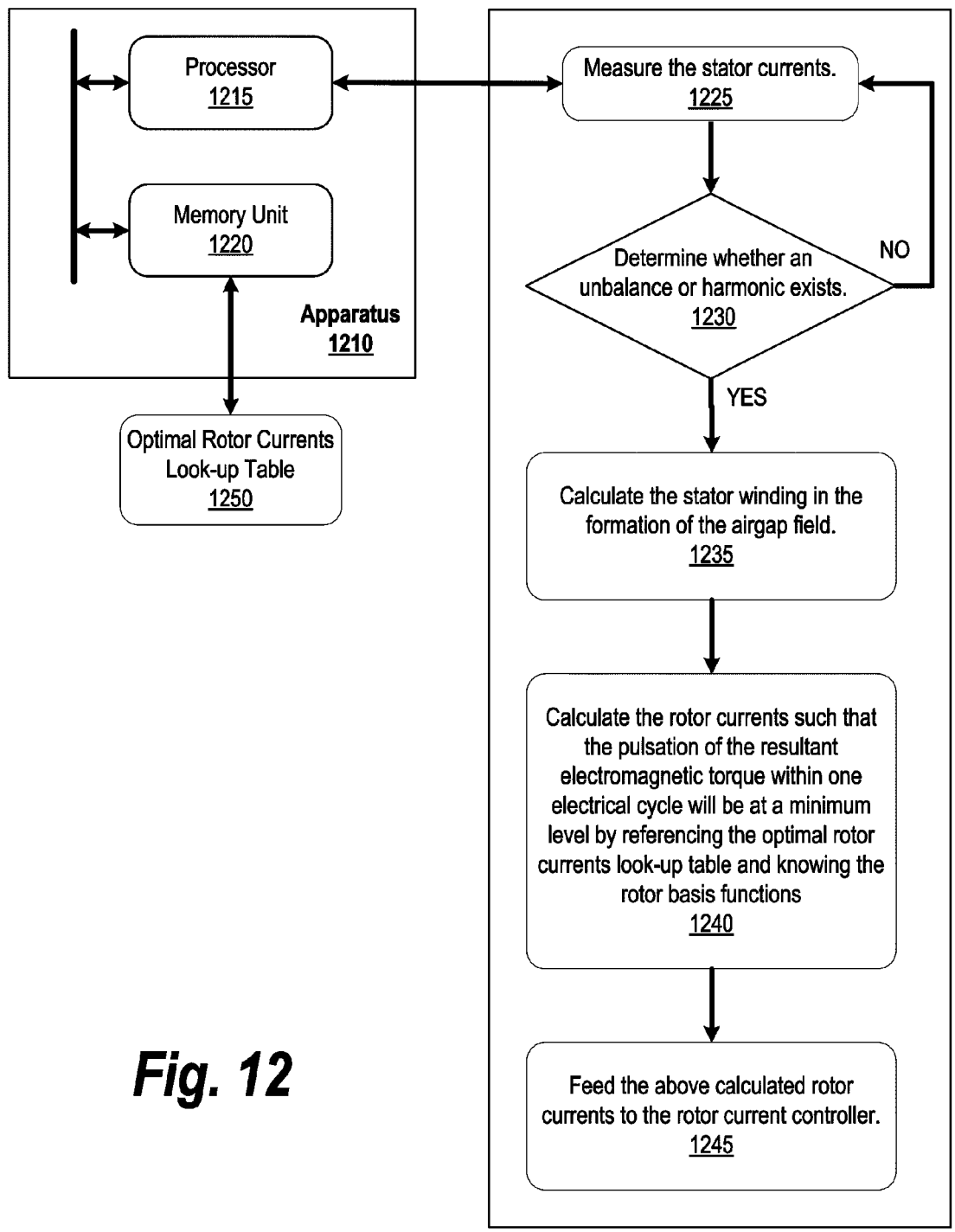
FIG. 12 is a block diagram illustrating an apparatus for substantially eliminating a torque pulsation in doubly fed induction generators, in accordance with some embodiments.

FIG. 12 is a block diagram illustrating an apparatus for substantially eliminating torque pulsation in doubly fed induction generators, in accordance with some embodiments.

In some embodiments, an apparatus 1210 comprises a processor 1215 and memory unit 1220. Processor 1215 is configured to perform computations and general control operations and memory unit 1220 is configured to store the optimal rotor currents look-up table 1250, which was created offline as previously described. The computations and the general control operations of the processor 1215 are to measure the stator currents 1225 in order to determine whether an unbalance or harmonic exists 1230. If an unbalance or harmonic exists, the contributions of the stator winding in the formation of the airgap field are calculated 1235. If an unbalance or harmonic does not exist, the stator currents measurement is repeated 1225. By referencing the optimal rotor currents look-up table and knowing the rotor basis functions, the rotor currents such that the pulsation of the resultant electromagnetic torque within one electrical cycle will be at a minimum level are calculated 1240 and fed to a rotor current controller 1245.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure also described various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for substantially eliminating torque pulsation in a doubly fed induction machine, the method comprising:
    measuring a stator current of the doubly fed induction machine;
    measuring a rotor current of the doubly fed induction machine;
    calculating a total magnetic flux density in an airgap of the doubly fed induction machine;
    calculating a tangential force density;
    calculating an electromagnetic torque;
    repeating the calculation of the electromagnetic torque over one electrical cycle to estimate a torque pulsation;
    determining a new rotor current that substantially eliminates the torque pulsation by referencing a set of optimal rotor currents in a look-up table; and
    changing the rotor current in response to the determination.

2. The method of claim 1, further comprising calculating the set of optimal rotor currents, wherein calculating the set of optimal rotor currents comprises:
    determining an optimal rotor current, wherein determining the optimal rotor current comprises:
        applying a known stator current to the doubly fed induction machine;
        calculating a field reconstruction model of the doubly fed induction machine;
        computing an electromagnetic torque resulting from applying the known stator current; and
        computing an optimal rotor current which substantially eliminates the electromagnetic torque.

3. The method of claim 2, wherein calculating the set of optimal rotor currents further comprises repeating the steps of determining the optimal rotor current.

4. The method of claim 2, wherein calculating the set of optimal rotor currents further comprises storing the set of optimal rotor currents in the look-up table.

5. The method of claim 2, wherein computing the optimal rotor current is completed within two electrical cycles.

6. The method of claim 1, wherein the doubly fed induction machine comprises a doubly fed induction generator.

7. The method of claim 1, wherein changing the rotor current comprises feeding the new rotor current into a rotor current controller.

8. The method of claim 1, wherein calculating the total magnetic flux density in the airgap of the doubly fed induction machine is calculated according to the equations of:

$$B_t(\phi_g) = \sum_{j=1}^{M} i_{rj} \cdot h_{tr}(\phi_g - \phi_{rj}) + \sum_{k=1}^{N} i_{sk} \cdot h_{ts}(\phi_g - \phi_{sk})$$

$$B_n(\phi_g) = \sum_{j=1}^{M} i_{rj} \cdot h_{nr}(\phi_g - \phi_{rj}) + \sum_{k=1}^{N} i_{sk} \cdot h_{ns}(\phi_g - \phi_{sk}),$$

where N denotes the number of stator conductors, M denotes the number of rotor conductors, $\phi_g$ denotes the airgap displacement, $\phi_s$ denotes the displacement in the stator, $\phi_r$ denotes the displacement in the rotor, $\phi_{sk}$ denotes the location of the k-th conductor in the stator, $\phi_{rj}$ denotes the location of the j-th conductor in the rotor, $h_{ts}$ denotes the tangential basis function for the stator, $h_{tr}$ denotes the tangential basis function for the rotor, $h_{ns}$ denotes the normal basis function for the stator, $h_{nr}$ denotes the normal basis function for the rotor, $i_{sk}$ denotes the magnitude of the current in the k-th stator conductor, and $i_{rj}$ denotes the magnitude of the current in the j-th conductor of the rotor.

9. The method of claim 1, wherein calculating the tangential force density is calculated according to the equation of:

$$f_t(\phi_g) = \frac{1}{\mu_0} B_n(\phi_g) B_t(\phi_g),$$

where $\mu_0$ denotes permeability of the air, $B_n(\phi_g)$ denotes the total normal magnetic flux density, and $B_t(\phi_g)$ denotes the total tangential magnetic flux density.

10. The method of claim 1, wherein calculating the electromagnetic torque is calculated according to the equation of:

$$T = LR \int_0^{2\pi} f_t(\phi_g) d\phi_g,$$

where L denotes the length of the stator, R denotes the radius of the rotor, $f_t(\phi_g)$ denotes the tangential force density, and $\phi_g$ denotes the airgap displacement.

11. An apparatus for substantially eliminating torque pulsation in a doubly fed induction machine, the apparatus comprising:
    one or more processors; and
    one or more memory units coupled to the processors, the apparatus being configured to:

measure a stator current of the doubly fed induction machine;

measure a rotor current of the doubly fed induction machine;

calculate a total magnetic flux density in an airgap of the doubly fed induction machine;

calculate a tangential force density;

calculate an electromagnetic torque;

repeat the calculation of the electromagnetic torque over one electrical cycle to estimate a torque pulsation;

determine a new rotor current that substantially eliminates the torque pulsation by referencing a set of optimal rotor currents in a look-up table; and change the rotor current in response to the determination.

12. The apparatus of claim 11, wherein the apparatus is further configured to calculate the set of optimal rotor currents, wherein calculating the set of optimal rotor currents comprises the apparatus being further configured to determine an optimal rotor current, wherein determining the optimal rotor current comprises:

applying a known stator current to the doubly fed induction machine;

calculating a field reconstruction model of the doubly fed induction machine;

computing an electromagnetic torque resulting from applying the known stator current; and computing an optimal rotor current which substantially eliminates the electromagnetic torque.

13. The apparatus of claim 12, wherein calculating the set of optimal rotor currents further comprises the apparatus being further configured to repeat the steps of determining the optimal rotor current.

14. The apparatus of claim 12, wherein calculating the set of optimal rotor currents further comprises the apparatus being further configured to store the set of optimal rotor currents in the look-up table.

15. The apparatus of claim 12, wherein computing the optimal rotor current is completed within two electrical cycles.

16. The apparatus of claim 11, wherein the doubly fed induction machine comprises a doubly fed induction generator.

17. The apparatus of claim 11, wherein the apparatus being configured to change the rotor current comprises feeding the new rotor current into a rotor current controller.

18. The apparatus of claim 11, wherein the apparatus being configured to calculate the total magnetic flux density in the airgap of the doubly fed induction machine is calculated according to the equations of:

$$B_t(\phi_g) = \sum_{j=1}^{M} i_{rj} \cdot h_{tr}(\phi_g - \phi_{rj}) + \sum_{k=1}^{N} i_{sk} \cdot h_{ts}(\phi_g - \phi_{sk})$$

$$B_n(\phi_g) = \sum_{j=1}^{M} i_{rj} \cdot h_{nr}(\phi_g - \phi_{rj}) + \sum_{k=1}^{N} i_{sk} \cdot h_{ns}(\phi_g - \phi_{sk}),$$

where N denotes the number of stator conductors, M denotes the number of rotor conductors, $\phi_g$ denotes the airgap displacement, $\phi_s$ denotes the displacement in the stator, $\phi_r$ denotes the displacement in the rotor, $\phi_{sk}$ denotes the location of the k-th conductor in the stator, $\phi_{rj}$ denotes the location of the j-th conductor in the rotor, $h_{ts}$ denotes the tangential basis function for the stator, $h_{tr}$ denotes the tangential basis function for the rotor, $h_{ns}$ denotes the normal basis function for the stator, $h_{nr}$ denotes the normal basis function for the rotor, $i_{sk}$ denotes the magnitude of the current in the k-th stator conductor, and $i_{rj}$ denotes the magnitude of the current in the j-th conductor of the rotor.

19. The apparatus of claim 11, wherein the apparatus being configured to calculate the tangential force density is calculated according to the equation of:

$$f_t(\phi_g) = \frac{1}{\mu_0} B_n(\phi_g) B_t(\phi_g),$$

where $\mu_0$ denotes permeability of the air, $B_n(\phi_g)$ denotes the total normal magnetic flux density, and $B_t(\phi_g)$ denotes the total tangential magnetic flux density.

20. The apparatus of claim 11, wherein the apparatus being configured to calculate the electromagnetic torque is calculated according to the equation of:

$$T = LR \int_0^{2\pi} f_t(\phi_g) d\phi_g,$$

where L denotes the length of the stator, R denotes the radius of the rotor, $f_t(\phi_g)$ denotes the tangential force density, and $\phi_g$ denotes the airgap displacement.

* * * * *